United States Patent [19]

Arakaki

[11] 4,042,208
[45] Aug. 16, 1977

[54] AUTOMOBILE BUMPER AND DOOR LIFTING AND POSITIONING ASSEMBLY

[76] Inventor: Tom S. Arakaki, 1563 S. Harvard, Los Angeles, Calif. 90006

[21] Appl. No.: 652,295

[22] Filed: Jan. 26, 1976

[51] Int. Cl.² .............................................. B66F 5/00
[52] U.S. Cl. ..................................... 254/8 B; 254/134
[58] Field of Search ............. 254/4 R, 4 B, 4 C, 8 R, 254/8 B, 8 C, 124, 127, 131, 133, 134, 139.1; 214/1 D; 269/71, 17

[56] References Cited

U.S. PATENT DOCUMENTS

| | | | |
|---|---|---|---|
| 2,554,900 | 5/1951 | Davies | 254/124 |
| 3,059,785 | 10/1962 | Buckeye | 254/8 R |
| 3,159,381 | 12/1964 | Graafsma et al. | 254/134 |
| 3,313,523 | 4/1967 | Reynolds | 254/133 R |
| 3,338,556 | 8/1967 | Sluse | 254/134 |
| 3,892,385 | 7/1975 | Andrist et al. | 254/133 R |
| 3,958,793 | 5/1976 | Garate | 254/133 R |

*Primary Examiner*—Al Lawrence Smith
*Assistant Examiner*—Robert C. Watson
*Attorney, Agent, or Firm*—Lyon & Lyon

[57] ABSTRACT

Disclosed herein is an apparatus for lifting and supporting automotive bumpers and doors for installation. The apparatus includes an upright support member which is carried by a wheel base portion, a lifting lever which is pivotally mounted on the support member and a lifting strap which is carried by one end of the lifting lever and by which the automobile door or bumper is held. A locking chain is provided to hold the lifting lever and door or bumper carried thereby in place in an elevated position for installation. A brace which extends from the upright support member is carried thereby for holding automobile bumpers in proper alignment with the vehicle for installation and an adjustable strap guide is disposed about the support member for varying the angular orientation of a bumper during installation.

5 Claims, 4 Drawing Figures

AUTOMOBILE BUMPER AND DOOR LIFTING AND POSITIONING ASSEMBLY

BACKGROUND OF THE INVENTION

The present invention relates to a device for lifting automobile doors and bumpers and holding the same in place during removal and installation. While several devices are currently used for such purposes, they are generally excessively expensive and do not provide the necessary flexibility or both. One class of such devices utilizes a lifting jack or jack for raising the door or bumper to the position where it can be bolted to the automobile. These devices are generally quite expensive and are somewhat limited in their flexibility in that they do not readily allow the automobile doors to be tilted along their horizontal axis an held in that place during installation which is necessary as such doors are not generally installed in a precisely vertical orientation. Similarly, these devices do not allow automobile bumpers to readily be tilted with respect to their vertical axis which is also necessary during installation. Accordingly, two individuals are often required to install a door or bumper when utilizing these devices.

Other devices for installing automotive doors and bumpers utilize pulling arrangements to lift and hold the bumpers in place. While such devices are generally less expensive and therefore more attractive to the smaller body shops, they also lack versitility and often do not allow the operator to position himself on the interior side of the door during installation thereby making the proper aligning of the bolt apertures extremely difficult without the aid of a second worker. In addition, such devices do not generally provide the necessary flexibility by which the door or bumper might be easily disposed and held in the proper alignment during installation.

The device of the present invention is not only of an economical construction and simple to operate, but allows a single person to both lift and maintain an automobile door or bumper in proper alignment during installation or removal. In addition, the device is so constructed such that when being used to install an automobile door, the operator can position himself on the interior side of the door where the bolt apertures are located thereby greatly facilitating installation. In addition, the present invention is easily adapted for lifting either automobile doors or bumpers thereby further increasing both the flexibility and efficiency of the device.

SUMMARY OF THE INVENTION

Briefly, the present invention comprises an apparatus for lifting doors and bumpers for installation and removal on automobiles. The apparatus includes a lifting lever which is pivotally mounted on a vertical support member and which carries a lifting strap near one end thereof for raising the door or bumper using a mechanical advantage. Means are provided for locking the lifting lever and door and bumper carried thereby in place at the desired height for installation. For use in installing or removing automobile bumpers, a brace and strap adjustment ring which are also carried by the vertical support member are adjusted to dispose the bumper at the desired angular orientation with respect to the end of the vehicle for securing the bumper thereto.

It is the principal object of the present invention to provide an economical and highly flexible apparatus for lifting automobile doors and bumpers for installation and removal.

It is another object of the present invention to provide an apparatus which can be easily operated by a single individual to lift automobile doors and bumpers and hold the same in place for installation and removal.

It is yet another object of the present invention to provide an apparatus for lifting automobile doors which allows the individual worker to position himself on the interior side of the door during installation and removal.

It is a still further object of the present invention to provide an apparatus for lifting and holding automobile doors and bumpers during installation which allows the door or bumper to be easily tilted by the operator to facilitate installation.

These and other objects and advantages of the present invention will become apparent in the following detailed description taken in conjunction with the accompanying drawings.

DESCRIPTION OF THE PREFERRED EMBODIMENT

Figure 1:
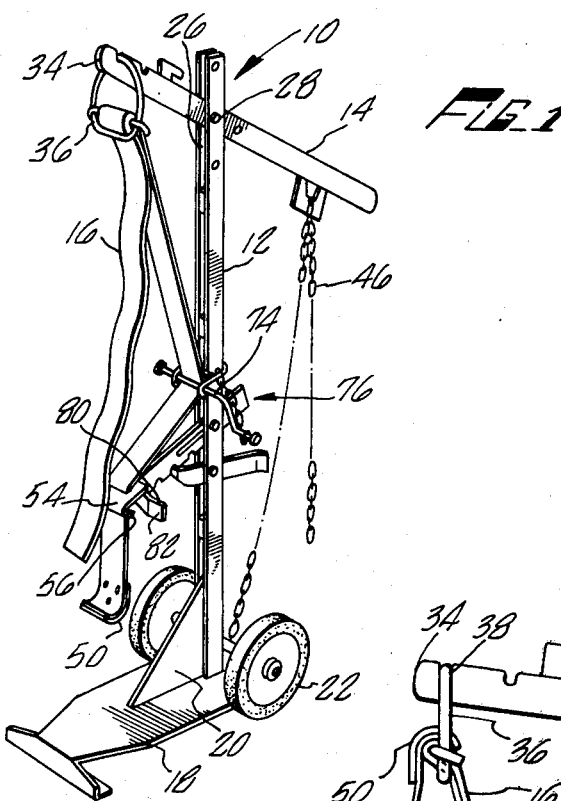
FIG. 1 is an isometric view illustrating the lifting assembly.
Figure 4:
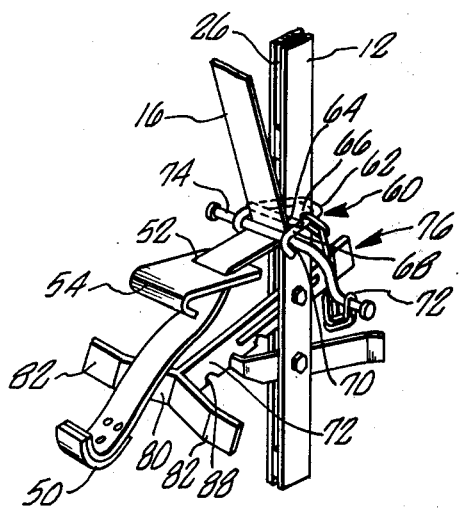
FIG. 4 is a partial view of the assembly illustrating the bumper brace and strap adjustment mechanism.

Referring now in detail to the drawings, the automobile door and bumper lifting assembly 10 is seen to be comprised of an upstanding support member 12, lifting lever 14 and lifting strap 16. The support member 12 is welded or otherwise rigidly affixed to a base portion 18 and a strengthening bracket 20 is preferably welded therebetween to provide additional strength at the point of juncture. Wheels 22 are rotatably mounted on the base portion 18 so that the apparatus 10 can be more easily moved about. In the preferred embodiment of the apparatus, the support member 12 is of a two piece construction defining a central slot 26 extending therethrough as best seen in FIGS 1 and 4. A portion of the strengthening bracket 20 preferably extends into the lower portion of slot 26 to facilitate the welding of the bracket to the support member as shown in FIG. 1.

The lifting lever 14 extends through the upper portion of the slot 26 and is secured to the support member 12 by a pin 28. Support member 12 is provided with a plurality of spaced apertures 30 adapted to receive pin 28 so that the height of the lifting arm may be adjusted for differently sized automobiles and the lifting arm 14 is also provided with a plurality of apertures 32 to vary the distance which the extended end 34 of the lifting lever 14 protrudes from the support member 12. It should be noted that an elongated slot (not shown) could be provided in the lifting lever 14 in lieu of the plurality of apertures 32 for adjustment purposes.

The lifting strap 16 is secured to the extended end 34 of the lifting lever 14 by means of buckle 36, the uppermost portion of which is disposed within a groove 38 in the upper end of the lifting lever. The rearward end 40 of the lifting lever is provided with a locking bracket 42 which when secured to the lever by welding or the like defines an aperture 44 to allow a locking chain 46 to pass therethrough as is clearly shown in the drawings. The bracket 42 also defines a slot 48 extending downwardly from the perimeter portion of the aperture 44 therein so that upon inserting a length of the locking chain within the slot, the chain is secured therein thereby locking the lifting lever in place.

Figure 2:
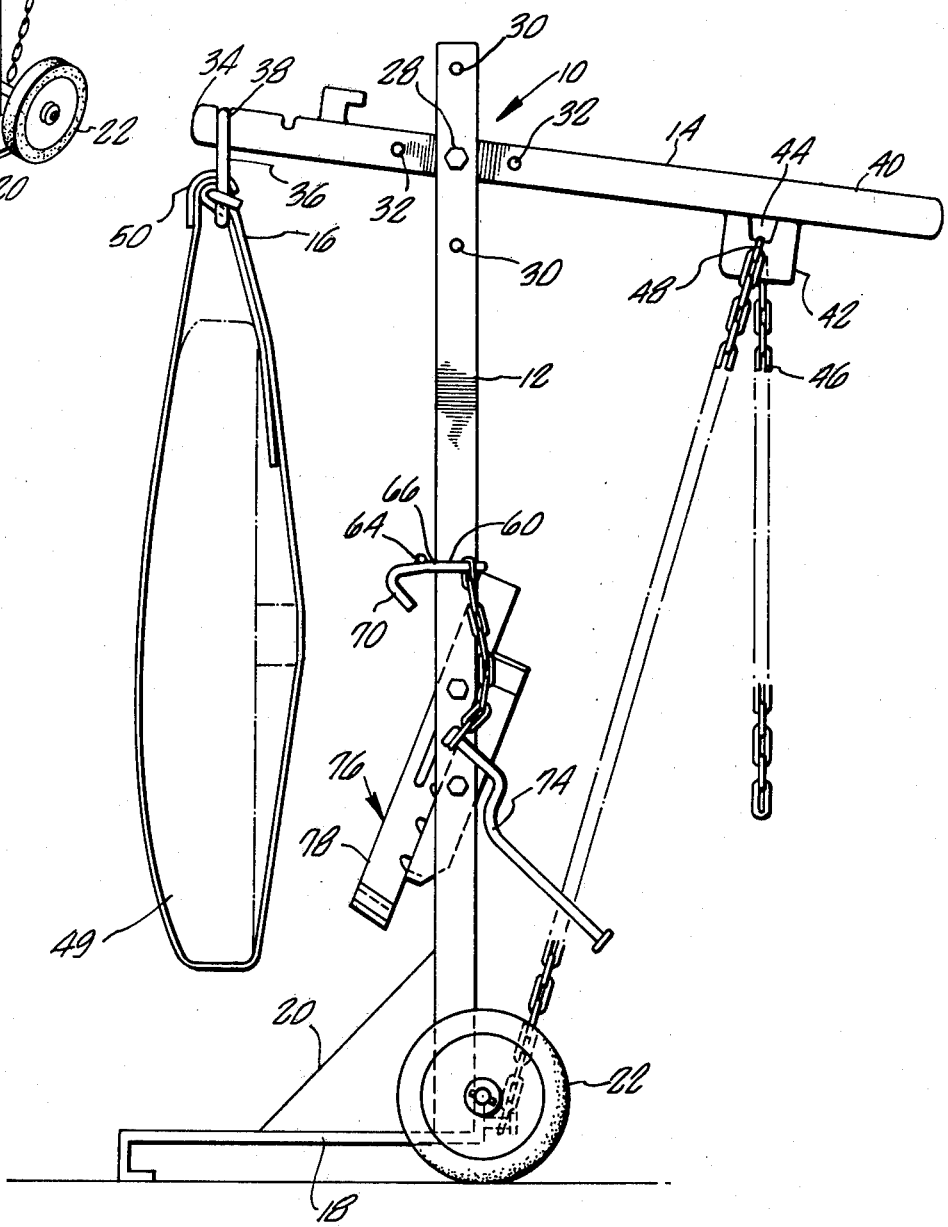
FIG. 2 is a side view of the lifting assembly holding an automobile door therein.

In using the lifting assembly 10 to install or remove an automobile door 49, the assembly is wheeled into position adjacent to the interior side of the door 49 as shown in FIG. 2. The height of the lifting lever and horizontal positioning of the extended end thereof is adjusted by means of pin 28 to the size and shape of the vehicle to which the door is being secured or removed. The lifting strap 16 is then disposed vertically about the door and tightened by means of buckle 16. In the embodiment illustrated in the drawings, the extended end of the strap is provided with a curved rigid hook portion 50 which is riveted to the strap and fits over the buckle in the tightened position as illustrated in FIG. 2. It is of course understood that different buckles or other tightening arrangements could be used to secure the strap about the door. The rearward end of the lifting lever is then lowered until the door has been sufficiently elevated to align the lug bolt apertures thereon with those of the automobile. The raising of the door is facilitated by the mechanical advantage obtained by the lifting lever. When the door is at the desired level, the locking chain is pulled taut and inserted into the slot 48 in the locking bracket 42 thereby locking the lifting lever and door in place. It is then a simple matter for the operator to tilt the door within the strap to any desired orientation with respect to the lifting assembly to perfectly align the bolt apertures in the door with those in the automobile and insert the locking bolts. Upon securing of the door to the vehicle, the chain is merely removed from the slot 48 in the locking bracket 42 on the lifting lever thereby loosening the strap which can then be easily removed from the door.

In using the lifting assembly 10 to install or remove an automobile bumper 51 (see FIG. 3), the end of the lifting strap having the rigid hook 50 thereon is inserted through a slot 52 in a metal catch 54 and positioned under the lower edge of the bumper. The catch 54 also has a curved catch portion 56 at the extended end thereof which is positioned about the upper inner edge 58 of the bumper 51. An adjusting ring lock 60 which is carried by the upstanding support member 12 is secured about the strap and the strap is pulled taut and secured by means of buckle 36. The ring lock 60, shown most clearly in FIG. 4, is comprised of a "V" shaped portion 62 having a transverse bar 64 extending thereacross to define an enclosed area 66 in which the support member 12 is disposed. The arms 68 of portion 62 terminate in hooks 70 and a chain 72 extends between portion 62 and a bent locking bar 74. In use, the locking bar 74 is placed about the strap in hooks 70. When the strap is pulled taut, the locking bar is pressed tightly against the hook portions 70 of the ring lock 60 thereby firmly holding the strap and metal catch 54 in place. By varying the vertical positioning of the locking bar on the upstanding support, the tension on strap 16 is correspondingly altered to vary the disposition of the bumper about a horizontal axis.

Figure 3:
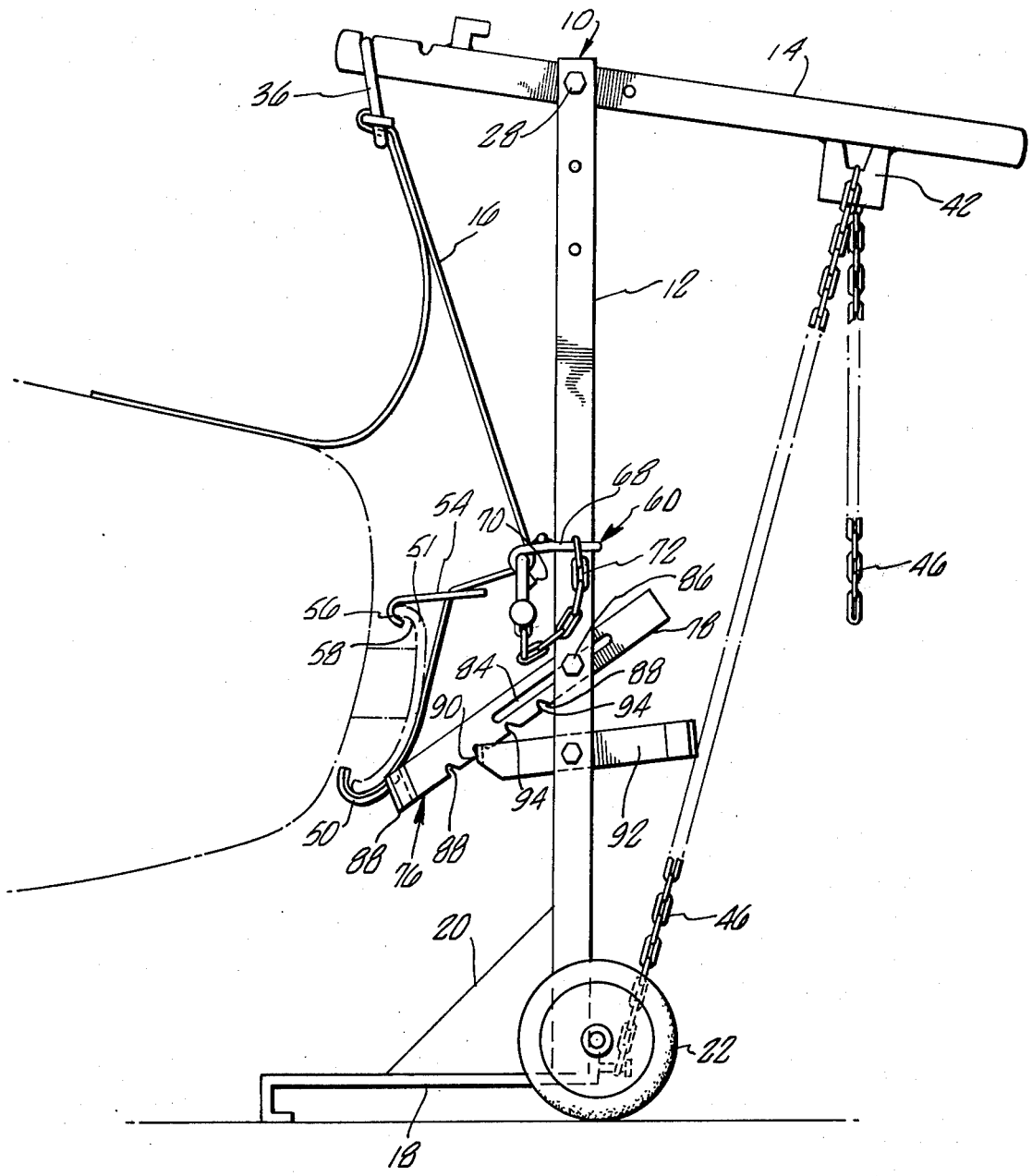
FIG. 3 is a side view of the lifting assembly supporting an automobile bumper.

An adjustable bumper brace 76 is also carried by the upstanding support 12 and presses against the lower portion of the bumper as shown in FIG. 3 to allow the bumper to be held in any desired angular disposition with respect to the ends of the automobile to facilitate securing the bumper thereto. The brace 76 is comprised of an arm portion 78 which extends through the slot 26 in the upstanding support member 12 and a transverse bar portion 80 which defines a pair of supporting surfaces 82 which in use are adapted to press against the bumper 51. The arm portion 78 of the brace has an elongated slot 84 therein to receive a pin 86 which extends through an aperture in the support member 12 and thereby adjustably secures the brace to the support member. The lower edge of the arm portion of the brace has a plurality of spaced receiving groves 88 cut therein to receive the extended end 90 of a locking bar 92 which is also pivotally secured to the support member 12 beneath the bumper brace 76. To facilitate holding the bumper brace in place, each of the grooves has a flat forward surface 94 which is adapted to mate with the extended end of the locking bar. To facilitate holding the bumper brace in place, each of the grooves has a flat forward surface 94 which is adapted to mate with the extended end of the locking bar. By providing the brace with a plurality of spaced receiving grooves, the brace can be adjusted as well as the positioning of locking bar 54 with respect to the upright support member to accomodate automobiles of varying size.

Various changes and modifications may be made in carrying out the present invention without departing from the spirit and scope thereof. Insofar as these changes and modifications are within the purview of the appended claims, they are to be considered as part of the invention.

I claim;

1. An automobile component lifting and positioning assembly comprising a base member, a vertical support carried by said base member, lifting means pivotally secured to said vertical support, adjustable means carried by said lifting means for holding and positioning an automobile bumper, said holding and positioning means comprising an elongated strap, means for adjustably securing said strap to said lifting means, means carried by said strap for holding the upper edge of said bumper, a rigid gripping member secured to one end of said strap for holding the lower edge of said bumper, means slidably mounted on said vertical support for drawing said strap toward said support to vary the tension exerted on the upper edge of said bumper by said holding means and means for locking said lifting means in place upon said bumper being lifted thereby, whereby the angular orientation of said bumper with respect to said automobile can be varied about a horizontal axis to position the bumper for attachment to said automobile.

2. The combination of claim 1 wherein said locking means comprises a link chain secured at one end to said base member and a bracket carried by said lifting member, said bracket having an aperture therein adapted for the passage of said chain therethrough and a slot extending radially from said aperture whereby upon raising said automobile door and inserting a link of said chain in said slot, said chain is secured to said bracket and said lifting means is locked in place.

3. An automobile component lifting and positioning assembly comprising a base member, a vertical support carried by said base member, lifting means pivotally secured to said vertical support, adjustable means carried by said lifting means for holding and positioning an automobile door and means for locking said lifting means in place upon said door being lifted thereby, said holding and positioning means further comprising an elongated strap adapted to fit about said door, a buckle assembly for adjustably securing one end of said strap to said lifting means, and a hooking member secured to the other end of said strap for securing said other end to said one end of said strap thereby securing said strap about said automobile door.

4. The combination of claim 3 wherein said hooking means is comprised of a rigid curvilinear member adapted to extend about a portion of said buckle in making contact with said one end of said strap.

5. An automobile component lifting and positioning assembly comprising a base member, a vertical support carried by said base member, lifting means pivotally secured to said vertical support, adjustable means carried by said lifting means for holding and positioning an automobile bumper and means for locking said lifting means in place upon said bumper being lifted thereby, said holding and positioning means further comprising an elongated strap, means for adjustably securing said strap to said lifting means, means carried by strap for holding the upper edge of said bumper, a gripping member secured to one end of said strap for holding the lower edge of said bumper, and means mounted on said vertical support for drawing said strap toward said support to vary the tension exerted on the upper edge of said bumper by said holding means whereby the angular orientation of said bumper with respect to said automobile can be varied about a horizontal axis to position the bumper for attachment to said automobile.

* * * * *